United States Patent [19]

Mauri

[11] 4,425,001
[45] Jan. 10, 1984

[54] CARRIAGE BODY FOR PUBLIC TRANSPORTATION VEHICLES

[76] Inventor: Ambrogio Mauri, Via Garibaldi, 254 - Desio, Milano, Italy

[21] Appl. No.: 113,869

[22] Filed: Jan. 21, 1980

[30] Foreign Application Priority Data

Jan. 22, 1979 [IT] Italy ................ 19503 A/79

[51] Int. Cl.³ .................................... B62D 27/02
[52] U.S. Cl. ................................ 296/178; 52/588; 296/210
[58] Field of Search .............. 296/178, 181, 191, 29, 296/210, 187; 52/47, 54, 55, 45, 588, 460, 464; 105/377, 422

[56] References Cited

U.S. PATENT DOCUMENTS

| | | | |
|---|---|---|---|
| 2,718,288 | 9/1955 | Boyer | 105/422 |
| 3,066,621 | 12/1962 | Dean et al. | 296/187 |
| 3,452,498 | 7/1969 | Kinsey | 52/588 |
| 3,813,839 | 6/1974 | Simpson, Jr. et al. | 52/588 |
| 3,881,765 | 5/1975 | Cerra et al. | 296/178 |
| 4,059,303 | 11/1977 | Mauri | 296/187 |
| 4,148,515 | 4/1979 | Knap | 296/187 |

FOREIGN PATENT DOCUMENTS

| | | | |
|---|---|---|---|
| 28897 | 7/1957 | Finland | 296/178 |
| 392284 | 9/1965 | Switzerland | 296/181 |

*Primary Examiner*—Joseph F. Peters, Jr.
*Assistant Examiner*—Ross Weaver
*Attorney, Agent, or Firm*—Guido Modiano; Albert Josif

[57] ABSTRACT

A carriage body structure for public transportation vehicles, having two sides comprising a latticework of uprights and stringers supporting each a sidewall longeron member whereto a respective roof longeron member is rigidly connected. The roof longeron members form the base members for the roof of the carriage body structure. The roof structure further comprises arcuated crossbeams connected with and extending between the roof longeron members, and wide elongated covering sectional members resting on the crossbeams and extending in the direction of the roof longeron members.

3 Claims, 6 Drawing Figures

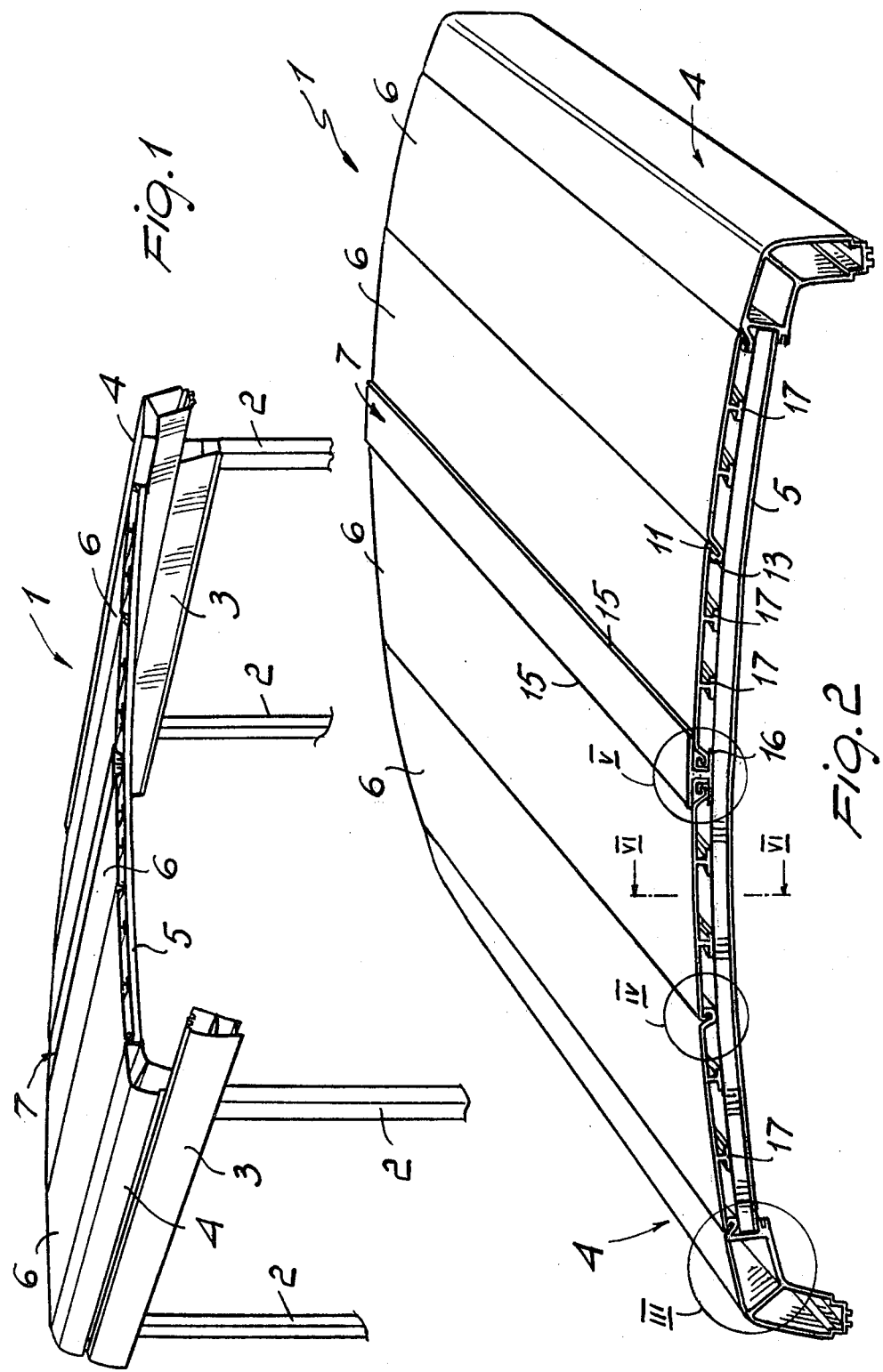

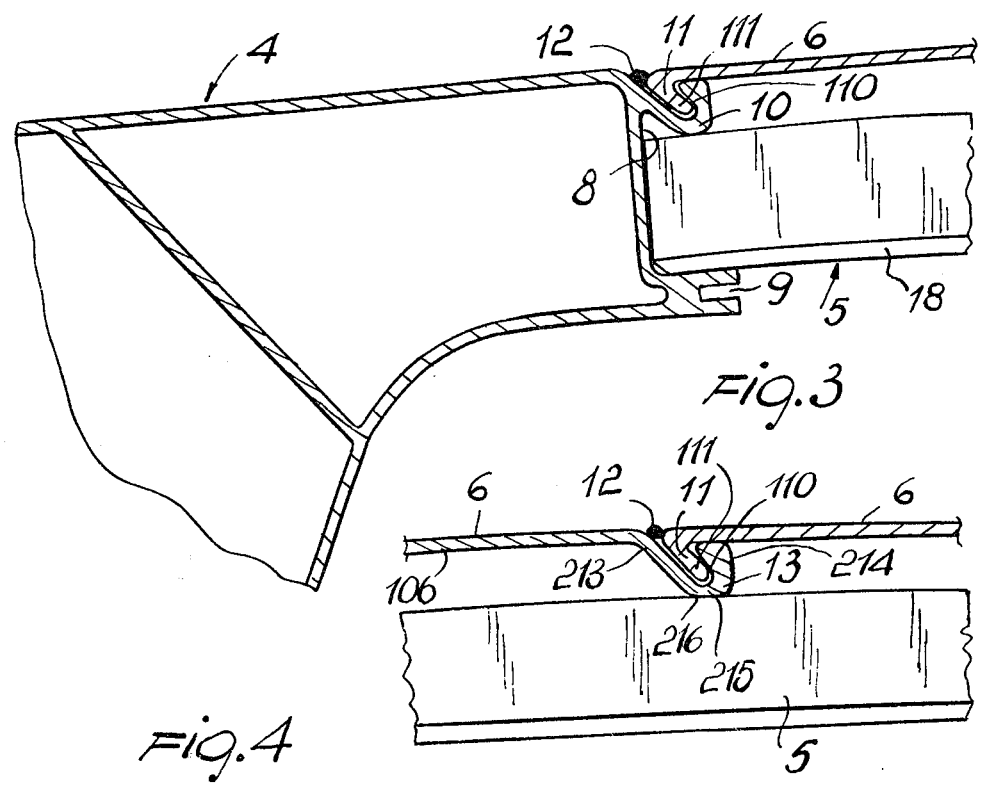
Fig.3
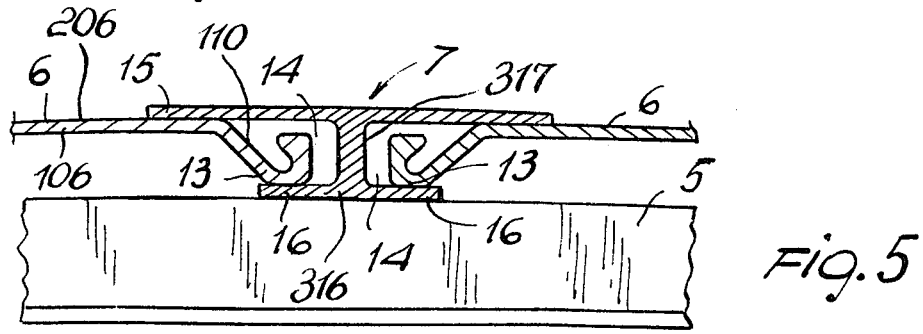
Fig.4
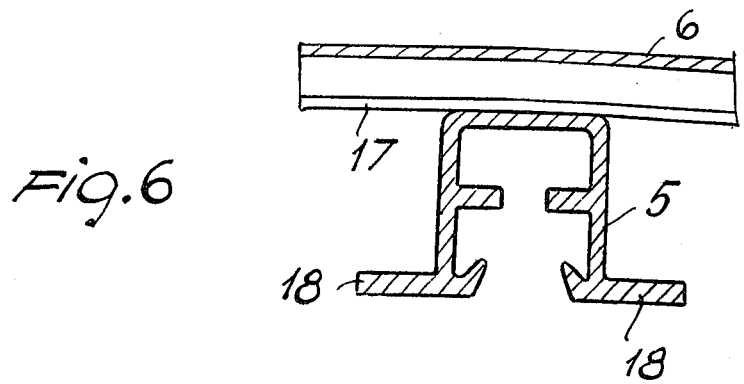
Fig.5
Fig.6

CARRIAGE BODY FOR PUBLIC TRANSPORTATION VEHICLES

BACKGROUND OF THE INVENTION

This invention relates to a carriage body for public transportation vehicles and more particularly concerns a light alloy roof structure for such carriage bodies.

A light alloy body structure for coaches, buses, trolley buses, streetcars and the like is disclosed in the U.S. Pat. No. 4,059,303 of the same Applicant. In essence, that structure is formed of a latticework skeleton of longerons and uprights forming the two body sides. The pattern of such structure is repeated in the vaults and roof, whereat the uprights are replaced by vault bows or arches and crossbeams.

In the cited patent, the latticework skeleton structures of the sides and roof, being much alike, are separated by longerons which frame and support the individual latticework skeletons. The evident rationality of such structure design concept has been confirmed also in vaulted shed roof, where it is now commonly employed. However, it has been found that if in an advanced schematization process the carriage body shell is likened to a tubular girder subjected to various stress conditions, then the load bearing and twist resisting functions, i.e. the stiffening of the shell against deformation as an articulated parallelogram, are mainly performed by the sides, while the roof or vaults having the primarily static function of supporting their own weight, plus any added weight, such as that of a snow layer or other occasional loads. Thus, the advisability of adopting a latticework structure for the roof becomes debatable, and the more so because that structure is an expensive one which involves, moreover, the lining thereof with sheet metal throughout.

SUMMARY OF THE INVENTION

Thus, it is a primary object of this invention to provide a carriage body, for public transportation vehicles, which is more functional and advantageous than conventional ones employing a latticework structure throughout.

A further object is to provide a body as indicated, wherein the most suitable constructional approach for the sides and the most suitable constructional approach for the roof, as independently determined, can be combined together.

Another object of the invention is to provide a roof structure which can be more readily adapted to existing sidewalls of a vehicle body as mentioned hereinabove.

Another object is to provide such a structure which would facilitate constructional and assembling operations.

These and other objects are achieved according to this invention by a carriage body structure for public transportation vehicles, wherein two sides comprising a latticework of uprights and stringers support each a sidewall longeron member whereto a respective roof longeron member is rigidly connected said roof longeron members forming the base members for the roof of said carriage body structure, characterized in that the roof structure further comprises arcuated crossbeams connected with and extending between said roof longeron members, and wide and elongated covering sectional members resting on said crossbeams and extending in the direction of said roof longeron members.

BRIEF DESCRIPTION OF THE DRAWINGS

The invention features will be further described with reference to a preferred exemplary embodiment thereof, in conjunction with the accompanying drawings, where:

FIG. 1 is a perspective view of the essential components of a carriage body structure according to the invention;

FIG. 2 is a perspective view, in an enlarged scale, of the cross-section of the carriage body roof;

FIGS. 3, 4 and 5 are cross-sectional detail views of the roof of FIG. 2; and

FIG. 6 is a partial longitudinal section view of the carriage body roof, as taken along the line VI—VI of FIG. 2.

DESCRIPTION ON THE PREFERRED EMBODIMENTS

A roof according to the teachings of this invention is generally indicated at 1, and is shown in FIG. 1 as applied to a carriage body, shown schematically, and in FIG. 2 as removed from the carriage body. The carriage body, whereto the roof is mounted of preference, is represented in FIG. 1 by four uprights 2, i.e. two opposedly arranged on each side, which support on each side one sidewall longeron 3 in a manner known per se and described in the above cited patent. Also quite conventionally the roof 1 is caused to rest on the sidewall longeron 3 by means of two roof longerons 4, which engage in jointed relationship the sidewall longerons 3 along the entire length thereof. The roof longerons 4 form the frame which delimits the roof and provides the base members for the roof structure. Slightly arcuated crossbeams 5 are connected with and extend between the roof longerons. The crossbeams 5 are spaced apart and parallel to one another, one crossbeam only being shown in each of FIGS. 1 and 2. The two roof longerons 4 and the crossbeams 5 form completely the roof framework skeleton, whereas the longitudinal stringers used in the above mentioned previous patent of the applicant have been completely eliminated; the mechanical functions of the such longitudinal stringers have been taken up in this invention by the covering structure, which in this instance, instead of conventional sheet metal panels attached to the roof framework, comprises wide elongated covering sectional members 6, preferably extending over the full length of the roof 1 and caused to rest onto the crossbeams 5 and engaged with one another. To take up manufacturing and assembling tolerances, as well as thermal expansion differentials, a central longitudinal conjunction structure 7 is provided which joins together the facing sides of the covering sectional members 6 located centrally to the roof 1.

The particular engineering solutions which make the above described structure feasible and convenient are illustrated more in detail in FIGS. 3 to 6.

In FIG. 3, there is shown an enlarged view of the detail III of FIG. 2. The roof longeron 4, in part of conventional design, which connects the novel roof to conventional sides, has been only marginally altered as compared to that of the cited U.S. patent; still present being a seat 8 for insertion and fixing therein of the ends of the crossbeams 5, and a groove 9 intended for inserting therein the edges of inside lining panels, not shown. However, the seat 8 is now bound at the top by a hook-like or an oblique U-shaped edge, indicated at 10, which retainingly accommodates an opposedly hooked edge 11 of a covering sectional member 6. In order to seal the joint between the roof longeron 4 and said covering sectional member 6, a continuous weld seam or bead 12 is applied along the full length of the joint. The seal is provided here in two ways; firstly, by means of the weld bead 12, itself a guarantee of tightness, in general, but not to a sufficient extent to rule out the possibility of local limited separations between the weld bead and metal or hairline cracks. These faults, which elude normal optical inspection, do not affect, owing to their very smallness, the mechanical bond of the joint, but could result in microscopic leakage paths which must be avoided in a most absolute manner. Secondly, the tight seal is accomplished by means of the shape of the joint, which is such as to generate, by virtue of the thermal expansion itself which results from the welding process and generates stresses and plastic as well as elastic deformation, a permanently forced fit between the tip of the hooked edge 11 and the inside of the U-like edge 10, and accordingly a stable surface adhesion or sticking of the same to each other, as evidenced in FIG. 3.

In fact owing to the heat emitted by the welding operation the tip or male formation of the hooked edge 11 expands towards the bottom of the female formation or groove formed by the U-like edge 10 and is pressed thereagainst to form the above indicated forced fit. Thereby the heated and pressed contacting surfaces are partially plasticized and even melt superficially and thereby a diffusion bonding between the contacting surfaces is obtained. Since the material used for the structural members is preferably light metal such as aluminium alloys or the like, the welding techniques should be of the type creating an inert or neutral atmosphere around the weld.

A similar longitudinal joint between two contiguous covering sectional members 6 is illustrated by the detail IV of FIG. 2, shown enlarged in FIG. 4. The U-like edge 13 of the covering sectional members 6 is identical to the U-like edge 10 of the roof girder 4, hence its joint will be effected similarly to the one just described and shown in FIG. 3 and will have the same properties.

It will be appreciated from the drawing that the covering sectional members 6 have on one side thereof one hook-like shaped formation 11 comprising a lip or tip 111, which snugly penetrates into a notch 110 formed by another hook-like shaped formation 13 which comprises a first tongue portion 213 forming an obtuse angle with the underside surface 106 of the covering sectional member 6 and a second tongue portion 214 bent hook-like over the first tongue portion 213 to define therebetween said notch 110 the shape of which is complemental to the shape of the lip 111 snugly received therein. The hook shaped formation 13 has also a bottom portion 215 bridging the first tongue portion 213 with the second tongue portion 214 and having a flat underside surface 216 adjustably resting on the crossbeam 5 (FIG. 4) or on the lower flange 16 of the double-T mechanical expansion joint member 7 (FIG. 5). Such double-T sectional member 7 has a web portion 317 the hight of which corresponds to the offset of the hook-like formation 13, i.e. the distance between the flat bottom surface 216 and the underside surface 106 of the covering sectional member 6. It will be further appreciated from the drawing that the lip 111 of the hook-like shaped formation 11 forms a sharp angle with the underside surface 106 of the covering sectional member 6. It will be further appreciated from FIG. 5 that the upper flange 15 of the double-T sectional member overlaps an end portion of the top surface 206 of the covering sectional member 6.

The longitudinal joint 7 of FIG. 5 comprises a double T-section member and may be termed a static mechanical expansion joint which, in addition to the apparent functions implied in its definition, is also required to provide a tight seal. These prerequisites are fulfilled by the longitudinal joint 7 through its opposite grooves 14 provided between its wings 15 and 16 and accomodating in force fit relationship two offset and oblique U-like edges 13 of the covering sectional members 6. As shown in FIG. 2, the covering sectional members on the right of the central joint 7 are reversed about a vertical axis with respect to the lefthand ones. The tight seal is favored by the elasticity of the wings or flanges 15 and 16 of the longitudinal joint 7, which bound the two grooves 14, as well as by the elasticity of the offset U-like shaped edges 13 themselves. If desired, the tight seal could be further improved by means of a suitable coating, longitudinal gaskets, or the like speciality techniques, or even by forming the joint from a suitable plastics.

FIG. 6 illustrates the shape and interaction of the crossbeams 5 in cross-section and panels 6 shown in longitudinal section, the same being shown in cross-section in FIG. 2. Each crossbeam 5 is generally a reversed "U" or channel sectional member, with edge wings or flanges 18 which protrude and are inserted into the seat 8 of the roof longerons 4. Inward flanges or ribs are provided in members 6 for snap engagement with fastening members for inner roof linings or coatings. The covering sectional members 6 bear on the backside or upperside of the crossbeams 5 through longitudinal ribs 17 of their own having an inverted "T" cross-sectional configuration, as shown in FIG. 2.

The longitudinal ribs 17 are not intended to replace the removed longitudinal stringers of the cited U.S. patent, but rather to provide local reinforcement against indentation or buckling.

A basic advantage of this invention resides in the novel manufacturing method which is made possible by the structure just described, the main steps whereof are outlined here below.

The roof 1 can be mounted on roof longerons 4 already installed on the sides, or simply arranged on assembly lines.

The crossbeams 5 are serially engaged with the roof longerons 4; then, the covering sectional members 6 are laid on the crossbeams, and quickly hooked first to said longerons, and then to each other, and finally pressure inserted into the longitudinal joint 7 which closes the middle portion of the roof.

The sealing welds, being all planar and linear, can be effected very rapidly with an automated process.

Thus, as the experts will appreciate, a construction has been provided which can be quickly completed, is economical, stable in shape, capable of withstanding the loads anticipated as well as impact loads and vibration, and one which is well protected against corrosion and leaks.

While a preferred embodiment of the invention has been described in detail hereinabove, any variations which may implement the teachings of the instant inventive concept are intended to fall within the scope of this invention.

I claim:

1. A roof structure for a carriage body for passenger transportation vehicles in combination with a pair of opposite horizontally spaced apart sidewall structures having opposite longitudinal supporting members for the roof structure, the roof structure comprising arcuated supporting crossbeams spanning between said opposite longitudinal supporting members and seat formations in said longitudinal supporting members for receiving therein the ends of said crossbeams, wide elongated mutually juxtaposed covering sectional members having an underside surface and longitudinal reinforcing ribs depending from the underside surface and resting on said crossbeams and extending in the direction of said longitudinal supporting members, wherein at least some of said covering sectional members have mutually overlapping longitudinally extending edges each having one hook-like shaped formation on one side of said covering sectional member and another hook-like shaped formation on the other side of the covering sectional member, said one and said another hook-like shaped formations being complemental in shape for mutual engagement, both said one and said another hook-like shaped formations being downwardly offset from said underside surface of the covering sectional member and wherein the roof structure further comprises at least one mechanical expansion joint connection arranged between and adjustably connecting two consecutive covering sectional members, the mechanical expansion joint connection comprising a longitudinally extending elongated sectional member having seat formations on opposite sides thereof facing and adjustably receiving therein the respective edges of the adjacent consecutive covering sectional members, and wherein said one hook-like shaped formation comprises a first lip forming sharp angle with the underside surface of said covering sectional member and said another hook-like shaped formation having a tongue including a first tongue portion forming an obtuse angle with said underside surface and substantially parallel with said first lip and a second tongue portion bent hook-like with respect to said first tongue portion and defining an inclined notch therewith for snugly receiving therein said first lip of an adjacent said covering sectional member, said covering sectional members having a top surface.

2. A structure according to claim 1, comprising a pair of consecutive said covering sectional members having their said another hook-like shaped formations facing each other at a distance from each other and a mechanical expansion joint connection arranged therebetween and adjustably connecting said another hook-like formations, said mechanical expansion joint connection comprising a double-T sectional member having a web portion and parallel spaced apart flanges connected by said web portion and a space between said flanges on both side of the double-T sectional member to adjustably receive therein each said another hook-like shaped formation, said first and said second tongue portions having a bottom portion bridging said first and said second tongue portion, said bottom portion having a flat underside bottom surface adjustably resting on the lower of the flanges of said double-T sectional member, an upper of the flanges of double-T sectional member extending lateraly to overlap at both sides thereof an end portion of the top surface of each adjacent covering sectional members, said web portion having a hight corresponding to the distance between said flat underside bottom surface and said top surface to provide an adjustable engagement therebetween.

3. A structure according to claim 2, in combination with sidewall structures having longitudinal supporting members with a seat formation for receiving therein the ends of said crossbeams, wherein said seat formation in said longitudinal supporting members has integral therewith a hook-like formation corresponding in shape to said another hook-like shaped formation for connection with said one hook-like formation of a terminal covering sectional member.

* * * * *